United States Patent
Miyake

[11] Patent Number: 6,009,213
[45] Date of Patent: *Dec. 28, 1999

[54] IMAGE PROCESSING APPARATUS AND METHOD

[75] Inventor: Nobutaka Miyake, Yokohama, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/847,760

[22] Filed: Apr. 23, 1997

[30] Foreign Application Priority Data

Apr. 25, 1996 [JP] Japan .................................. 8-105402

[51] Int. Cl.⁶ .................................................. G06K 9/32
[52] U.S. Cl. ........................... 382/300; 358/458; 358/466
[58] Field of Search .................................... 382/252, 266, 382/270, 298, 299, 300; 358/455, 458, 466

[56] References Cited

U.S. PATENT DOCUMENTS

| | | | |
|---|---|---|---|
| 4,725,885 | 2/1988 | Gonzales | 348/411 |
| 5,054,100 | 10/1991 | Tai | 382/47 |
| 5,121,446 | 6/1992 | Yamada et al. | 382/252 |
| 5,131,057 | 7/1992 | Walowit et al. | 382/41 |
| 5,245,678 | 9/1993 | Eschbach et al. | 382/252 |
| 5,282,051 | 1/1994 | Walker | 358/401 |
| 5,361,142 | 11/1994 | Semasa | 358/455 |
| 5,363,210 | 11/1994 | Sasaki et al. | 382/266 |
| 5,760,921 | 6/1998 | Miyake | 358/458 |

FOREIGN PATENT DOCUMENTS

| | | |
|---|---|---|
| 0645736 | 3/1995 | European Pat. Off. . |
| 0645736A2 | 3/1995 | European Pat. Off. .......... G06T 3/40 |
| 0677820A2 | 10/1995 | European Pat. Off. .......... G06T 3/40 |
| 7093531 | 4/1995 | Japan ............................. G06T 3/40 |
| 7105359 | 4/1995 | Japan ............................. G06T 3/40 |
| 7107268 | 4/1995 | Japan ............................. H04N 1/387 |

OTHER PUBLICATIONS

"Edge Preserved Image Zooming", Yao Wang et al., Signal Processing: Thoeries And Applications, Grenoble, Sep. 5–8, 1998, vol. 3, Conf.4, Sep. 5, 1998, pp. 1445–1448, XP000093910.

*Primary Examiner*—Amelia Au
*Assistant Examiner*—Jingge Wu
*Attorney, Agent, or Firm*—Fitzpatrick, Cella, Harper & Scinto

[57] ABSTRACT

An image processing apparatus includes a window setting unit which sets a window for input low-resolution information, including a target pixel and pixels surrounding the target pixel. A detection unit detects MAX and MIN values from among the pixels within the window, and a quantization unit quantizes information relating to each pixel, having n values within the window, into a value smaller than n. A LUT (look-up table) determines a distribution ratio of the MAX and MIN values based on quantized values provided by the quantization unit within the window. A transformation unit synthesizes the MAX and MIN values based on the distribution ratio, and a forming unit forms high-resolution output information from the synthesized values. Thus, input low-resolution information is converted into high-resolution output information, at a high speed, to produce a high quality image.

6 Claims, 12 Drawing Sheets

| 226 | 225 | 226 | 224 | 224 | 225 | 225 |
| --- | --- | --- | --- | --- | --- | --- |
| 226 | 225 | 225 | 224 | 224 | 225 | 226 |
| 30  | 224 | 210 | 209 | 215 | 224 | 224 |
| 85  | 87  | 89  | 206 | 211 | 221 | 224 |
| 85  | 88  | 92  | 94  | 96  | 220 | 224 |
| 88  | 89  | 92  | 95  | 96  | 98  | 98  |
| 92  | 92  | 92  | 95  | 97  | 98  | 99  |

FIG.4

| 1 | 1 | 1 | 1 | 1 | 1 | 1 |
|---|---|---|---|---|---|---|
| 0 | 1 | 1 | 1 | 1 | 1 | 1 |
| 0 | 0 | 0 | 1 | 1 | 1 | 1 |
| 0 | 0 | 0 | 0 | 0 | 1 | 1 |
| 0 | 0 | 0 | 0 | 0 | 0 | 0 |

FIG.5

| 1 1 1 |  |
|---|---|
| 0 1 1 | → 141 |
| 0 0 0 |  |

| 1 1 1 |  |
|---|---|
| 1 1 1 | → 240 |
| 0 0 1 |  |

| 1 1 1 |  |
|---|---|
| 1 1 1 | → 256 |
| 1 1 1 |  |

| 0 0 1 |  |
|---|---|
| 0 0 0 | → 5 |
| 0 0 0 |  |

| 1 1 1 |  |
|---|---|
| 1 1 1 | → 250 |
| 0 1 1 |  |

| 0 1 1 |  |
|---|---|
| 0 0 0 | → 10 |
| 0 0 0 |  |

| 1 1 1 |  |
|---|---|
| 0 0 1 | → 90 |
| 0 0 0 |  |

J= MIN ( |A-E|, |B-E|, |C-E|, |D-E| )

= |X-E|

(J IS THE SHORTEST DISTANCE FROM THE INTERPOLATED POINT TO THE OBSERVED POINT, X IS THE OBSERVED POINT FOR PROVIDING THE SHORTEST DISTANCE)

INSERTED POINT E=X

FIG.11

INSERTED POINT E = (1-i)(1-j)A + i·(1-j)B + j·(1-i)C + ijD

FIG.12
PRIOR ART

| 200 | 10 | 10 | 10 |
|-----|-----|-----|-----|
| 10 | 200 | 10 | 10 |
| 10 | 10 | 200 | 10 |
| 10 | 10 | 10 | 200 |

| 200 | 200 | 10 | 10 | 10 | 10 | 10 | 10 |
|-----|-----|-----|-----|-----|-----|-----|-----|
| 200 | 200 | 10 | 10 | 10 | 10 | 10 | 10 |
| 10 | 10 | 200 | 200 | 10 | 10 | 10 | 10 |
| 10 | 10 | 200 | 200 | 10 | 10 | 10 | 10 |
| 10 | 10 | 10 | 10 | 200 | 200 | 10 | 10 |
| 10 | 10 | 10 | 10 | 200 | 200 | 10 | 10 |
| 10 | 10 | 10 | 10 | 10 | 10 | 200 | 200 |
| 10 | 10 | 10 | 10 | 10 | 10 | 200 | 200 |

| 200 | 105 | 10 | 10 | 10 | 10 | 10 | 10 |
|-----|-----|-----|-----|-----|-----|-----|-----|
| 105 | 105 | 105 | 58 | 10 | 10 | 10 | 10 |
| 10 | 105 | 200 | 105 | 10 | 10 | 10 | 10 |
| 10 | 58 | 105 | 105 | 105 | 58 | 10 | 10 |
| 10 | 10 | 10 | 105 | 200 | 105 | 10 | 10 |
| 10 | 10 | 10 | 58 | 105 | 105 | 105 | 58 |
| 10 | 10 | 10 | 10 | 10 | 105 | 200 | 105 |
| 10 | 10 | 10 | 10 | 10 | 58 | 105 | 105 |

IMAGE PROCESSING APPARATUS AND METHOD

BACKGROUND OF THE INVENTION

1. Field of the Invention

This invention relates to an image output apparatus, such as a printer or the like, for magnifying an image represented by input image information and outputting the resultant image, and to an image processing apparatus and method for performing resolution transformation from low-resolution information to high-resolution information in communication between apparatuses having different levels of resolution.

2. Description of the Related Art

Figure 10:
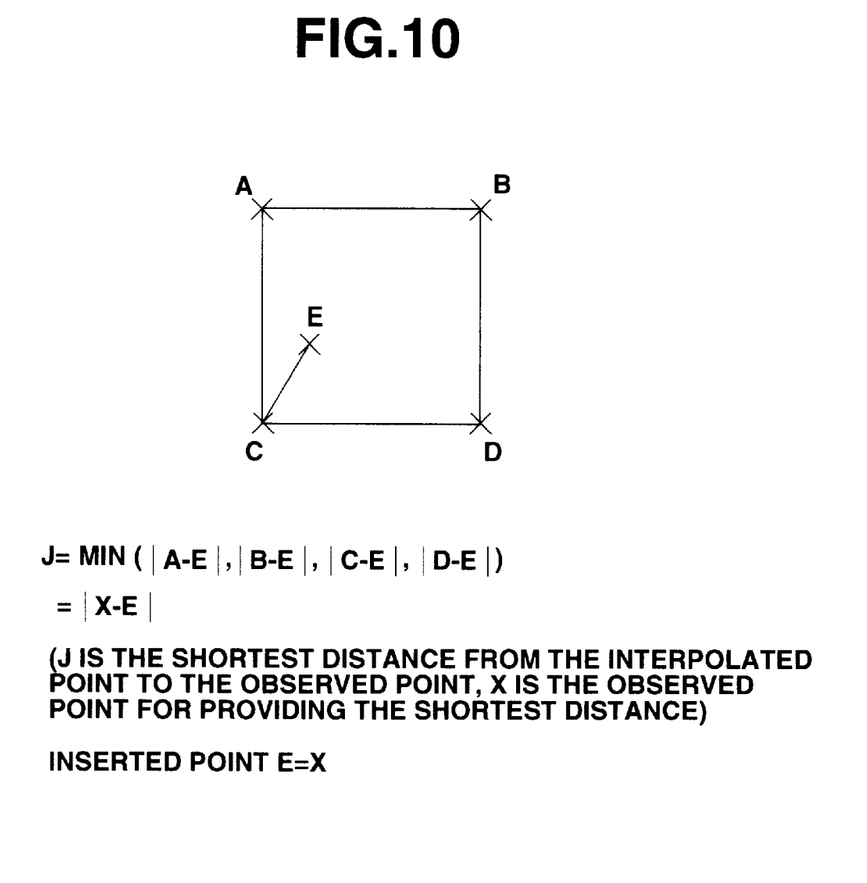
FIG. 10 is a diagram illustrating a closest interpolation method.
Figure 11:
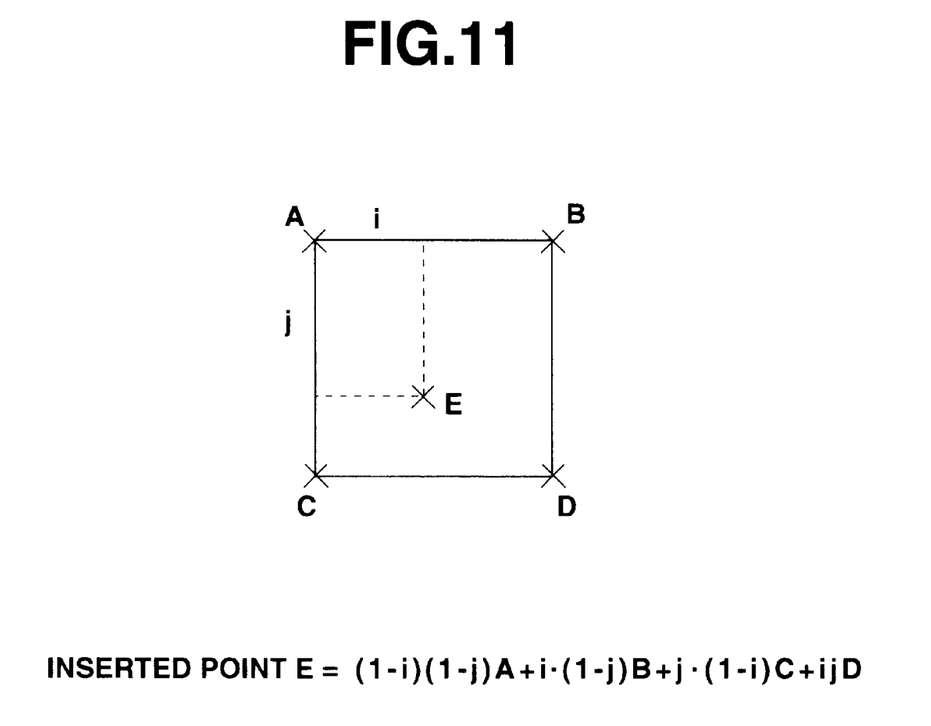
FIG. 11 is a diagram illustrating a coprimary interpolation method.

Various methods for performing resolution transformation from input low-resolution information into high-resolution information have been proposed. In the proposed conventional methods, transformation processing differs depending on the type of image to be processed (i.e., a multivalue image having gradation information for each pixel, a binary image subjected to binary coding using pseudohalftone, a binary image subjected to binary coding using a fixed threshold, a character image, or the like). For example, a closest interpolation method in which, as shown in FIG. 10, the value of a pixel closest to an interpolated point is allocated to the point, and a coprimary interpolation method in which, as shown in FIG. 11, a pixel value E is determined according to the following calculation using the distances from four points surrounding an interpolated point (the pixel values of the four points are represented by A, B, C and D):

$$E=(1-i)(1-j)A+i\cdot(1-j)B+j\cdot(1-i)C+ijD$$

(i and j are the horizontal direction and vertical direction respectively from a point A when the distance between pixels is assumed to be 1 ($i \leq 1, j \leq 1$)), and are generally used as conventional interpolation methods.

However, the above-described conventional approaches have the following problems.

That is, the method shown in FIG. 10 has the feature that the configuration is simple. However, when a natural image or the like is used as an object image, since pixel values are determined for each block to be magnified, a difference is observed between respective blocks, thereby degrading the quality of the obtained image.

Figure 2:
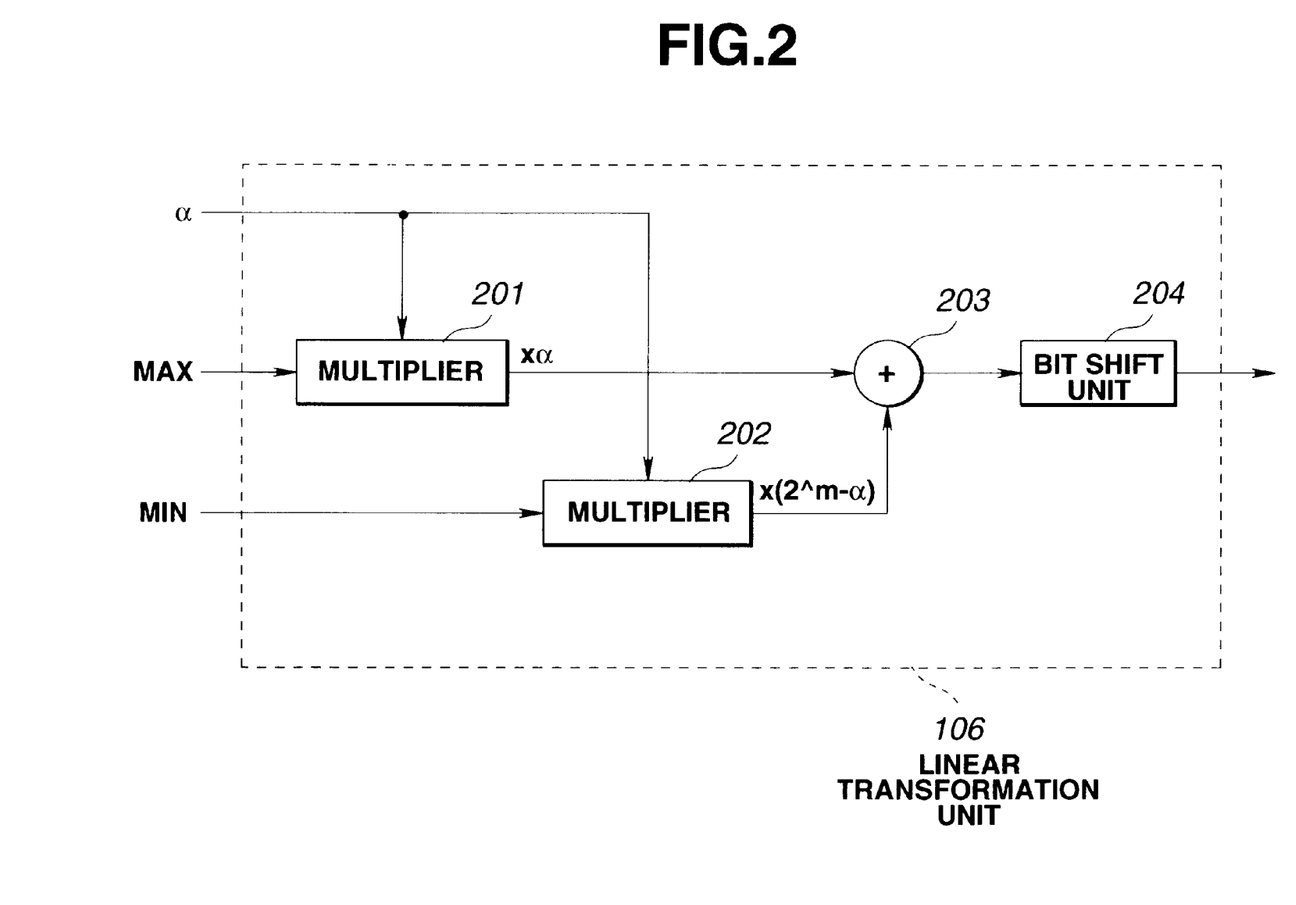
FIG. 2 is a block diagram illustrating the configuration of a linear transformation unit shown in FIG. 1.
Figure 3:
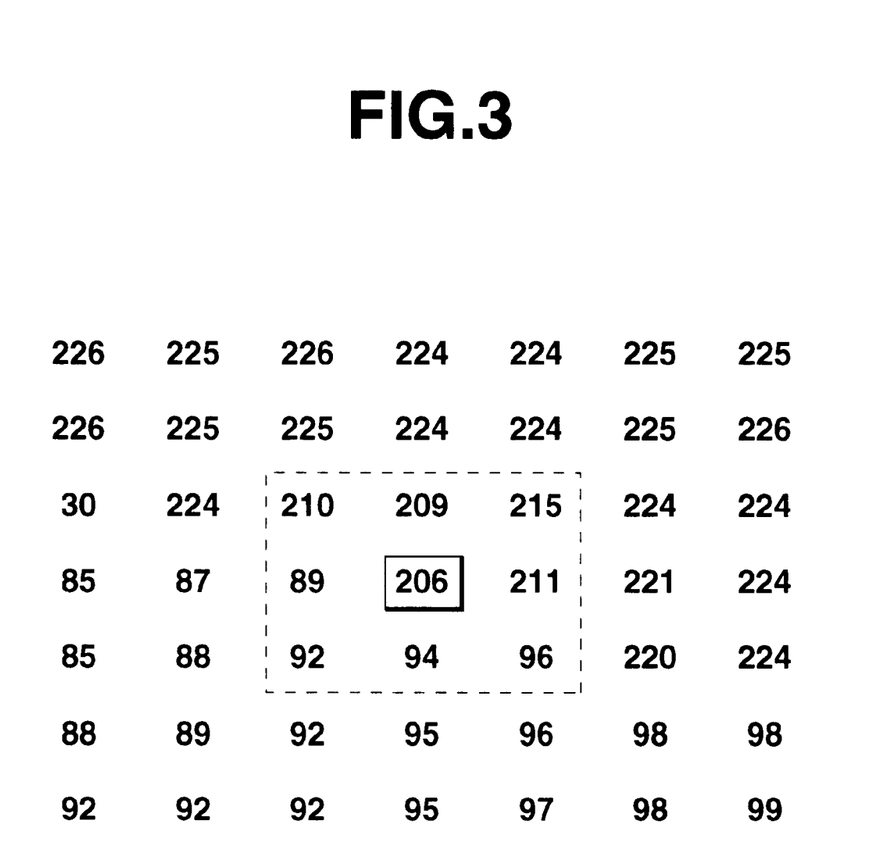
FIG. 3 is a diagram illustrating an example of image information.
Figures 12, 13:
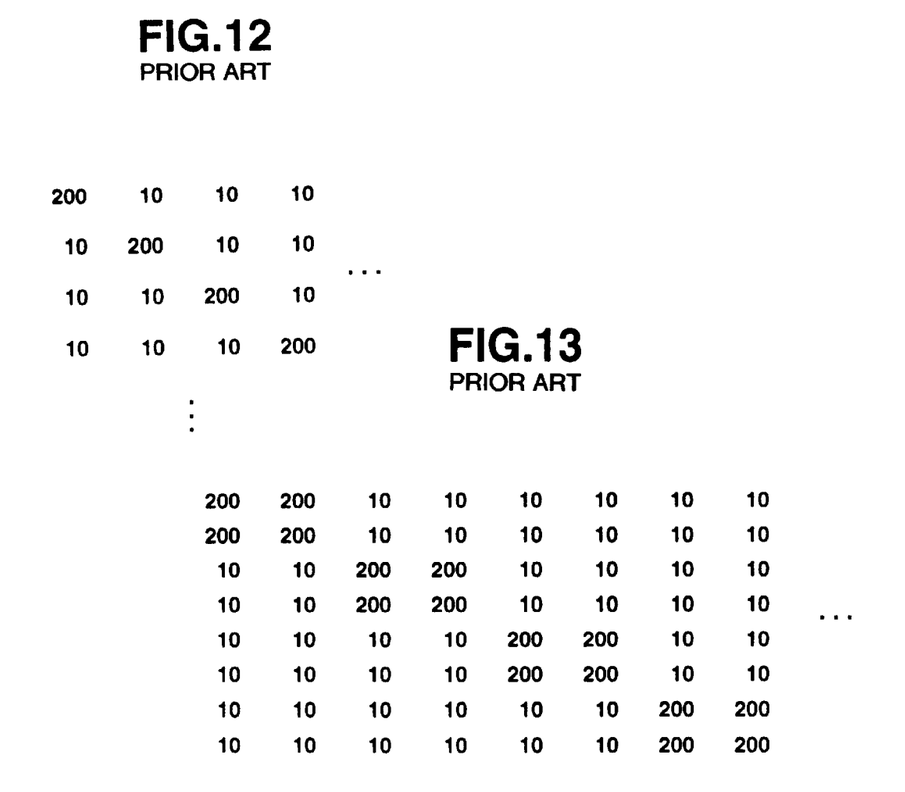
FIG. 12 is a diagram illustrating an example of input information.
FIG. 13 is a diagram illustrating an example of processing according to the method shown in FIG. 10.

When a character image, a line image, a CG (computer graphics) image or the like is used as an object image, since the same pixel value continues in each block to be enlarged, an inferior image in which a zigzag line called a called jaggy appears particularly at an oblique line is generated. FIGS. 2 and 3 illustrate how jaggy is generated. FIG. 12 illustrates input information, and FIG. 3 illustrates an example of a resolution transformation in which the number of pixels is doubled both in the vertical and horizontal directions according to the method shown in FIG. 10. In general, as magnification increases, the degree of degradation in picture quality increases (each of numerals "200" and "10" in FIGS. 12 and 13 represents the value of a corresponding pixel).

The method shown in FIG. 11 is generally used when magnifying a natural image. Although this method provides averaged and smoothed pixels, edge portions or portions where a sharp image is required become indistinct. Furthermore, for example, in an image obtained by scanning a map or the like, or a natural image containing character portions, important information is missed, in some cases, an the observer due to indistinctness in the generated image caused by interpolation.

Figure 14:
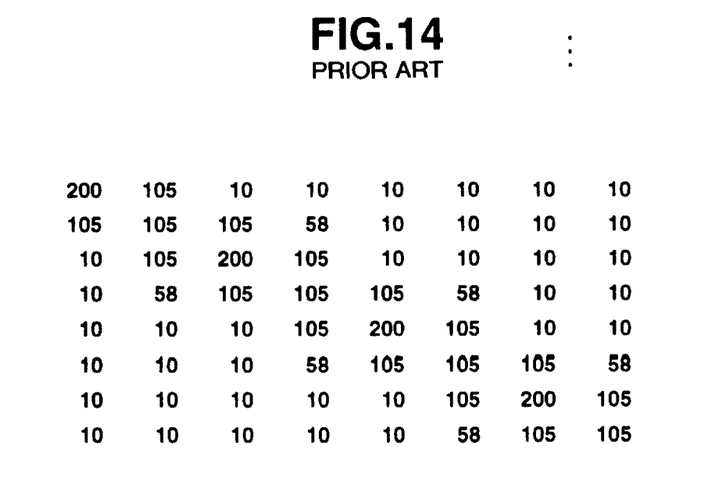
FIG. 14 is a diagram illustrating an example of processing according to the method shown in FIG. 11.

FIG. 14 illustrates image information obtained by performing interpolation processing by doubling the input image information shown in FIG. 12 in the vertical and horizontal directions according to the method shown in FIG. 11.

As is apparent from FIG. 14, pixel values are non-uniform and an indistinct image is generated not only for portions in the vicinity of an oblique line but also for the oblique line itself.

Accordingly, the assignee of the present application has proposed, in Laid-Open Japanese Patent Applications (Kokai) Nos. 7-93531 (1995), 7-107268 (1995) and 7-105359 (1995), methods capable of performing resolution transformation without producing an indistinct image due to interpolation and generating a jaggy when forming high-resolution information from low-resolution information.

The basic concept in these proposals resides in removing resolution-dependent components from input original information, increasing the number of pixels in the resultant information so as to correspond to an output resolution, and inferring and forming information corresponding to a new resolution. The resolution-dependent component is removed by performing smoothing processing using an LPF (low-pass filter), and the number of pixels is increased by linear interpolation. When inferring high-resolution information, information after interpolation is subjected to simple binary coding, and pixel values to be output are calculated by performing different types of processing for pixels classified as "1" and for pixels classified as "0".

However, since the techniques disclosed in the above-described patent applications perform smoothing processing using adaptive digital filters, the number of accumulation and summation operations is large, thereby increasing the processing time.

Usually, resolution transformation processing is executed within application software in a host computer, or a printer driver for providing a printer output, and therefore high-speed processing is an important task.

In addition, since the types of adaptive digital filters are limited, it is not easy to perform optimum conversion for all types of image information.

SUMMARY OF THE INVENTION

It is an object of the present invention to solve the above-described problems.

It is another object of the present invention to provide an image processing apparatus and method in which, when transforming input low-resolution information into high-resolution information, an interpolation technique capable of obtaining excellent pixture quality with a high degree of freedom in the design of an image at a speed higher than ever can be realized, and a high-quality high-resolution image can be obtained even from an image having a small amount of information.

According to one aspect, the present invention which achieves these objectives relates to an image processing apparatus for transforming input low-resolution information into high-resolution information by increasing the number of pixels. The apparatus includes an input unit for inputting low-resolution information having n values (n>2) for each pixel, a window setting unit for setting a window including information relating to a low-resolution target pixel and pixels surrounding the target pixel, a detection unit for detecting a first value A and a second value B from among a plurality of pixels within the window, a transformation unit for transforming information relating to each pixel having n values within the window into a value smaller than n, a determination unit for determining a distribution ratio of the values A and B based on transformed values provided by the transformation unit within the window, a synthesis unit for synthesizing the values A and B based on the distribution ratio determined by the determination unit, and a forming unit for forming high-resolution information based on synthesized values by the synthesis unit.

According to still another aspect, the present invention which achieves these objectives relates to an image processing method for converting input low-resolution information into high-resolution information by increasing a number of pixels. The method includes the steps of inputting low-resolution information having n values (n>2) for each pixel, setting a window including information relating to a low-resolution target pixel and pixels surrounding the target pixel, detecting a first value A and a second value B from among a plurality of pixels within the window, transforming information relating to each pixel having n values within the window into a value smaller than n, determining a distribution ratio of the values A and B based on the transformed values provided in the transforming step within the window, synthesizing the values A and B based on the distribution ratio determined in the determining step, and forming high-resolution information based on a synthesized value in the synthesizing step.

The foregoing and other objects, advantages and features of the present invention will become more apparent from the following detailed description of the preferred embodiments taken in conjunction with the accompanying drawings.

DETAILED DESCRIPTION OF THE PREFERRED EMBODIMENTS

Figure 1:
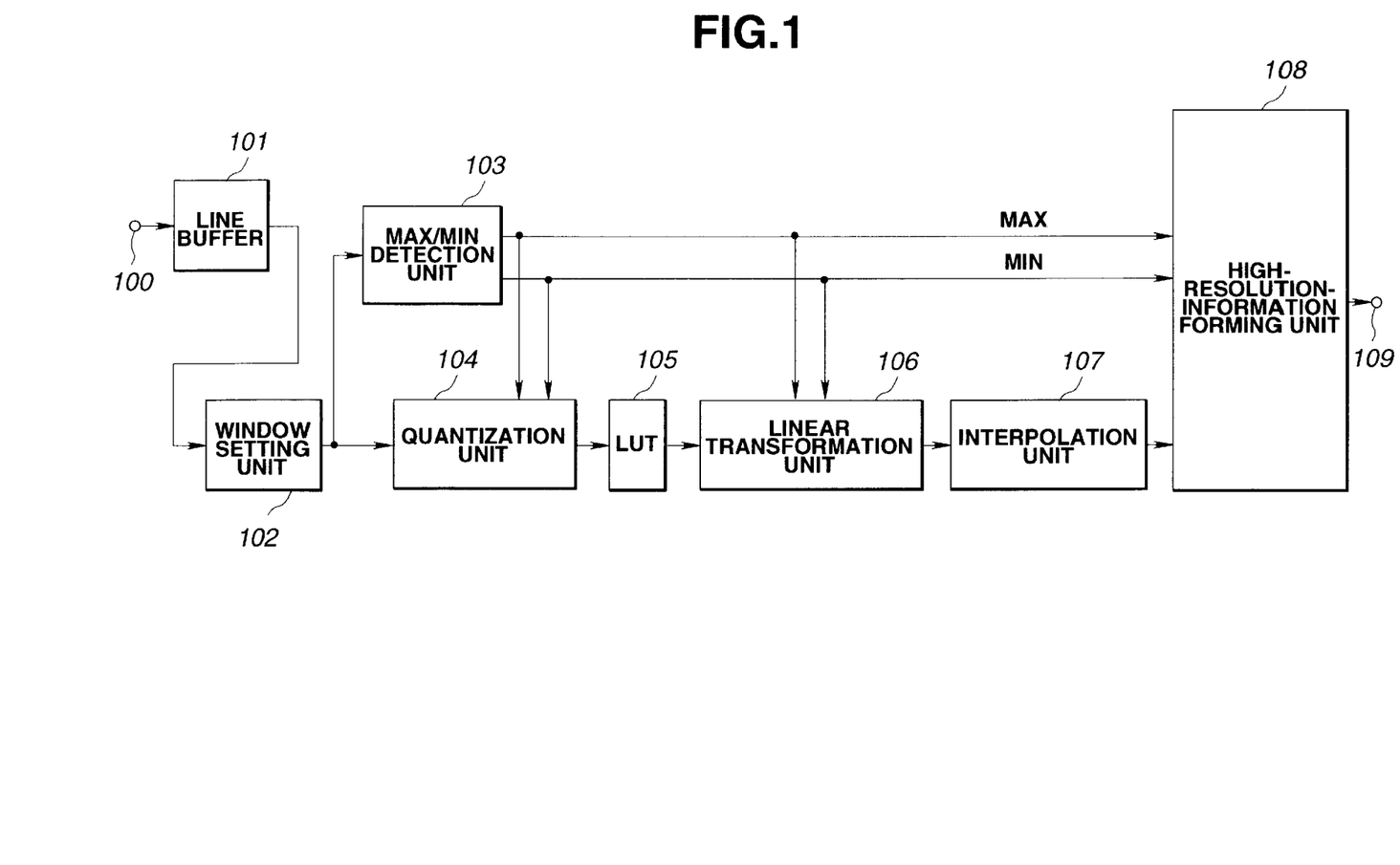
FIG. 1 is a block diagram illustrating the configuration of an image processing apparatus according to an embodiment of the present invention.

FIG. 1 is a block diagram illustrating a principal portion of an image processing apparatus according to an embodiment of the present invention. The image processing apparatus of the embodiment is incorporated within an image output apparatus, such as a printer connected to a computer, a video printer for inputting a video signal, or the like, however the image processing apparatus may also be incorporated as application software within a computer, or as a printer-driver software to be output to a printer.

The operation procedures of the embodiment is described with reference to the block diagram shown in FIG. 1. In the present embodiment, a description is provided of a case in which input image information is transformed into information having the number of pixels multiplied by N times and M times (N≧2, M≧2) in the vertical direction and the horizontal direction, respectively.

In FIG. 1, low-resolution image information having n values (n>2) for each pixel is input to an input terminal 100. The input low-resolution information for a few lines is stored in a line buffer 101. A window setting unit 102 sets a window including a plurality of pixels surrounding a target pixel including the target pixel from the image information for a few lines. Although the window generally has the shape of a rectangle around the target pixel, the window may, of course, have a shape other than a rectangle. A MAX/MIN detection unit 103 detects a maximum (MAX) value and a minimum (MIN) value from the image information within the window. A quantization unit 104 quantizes each of the pixels within the window based on the MAX and MIN values. In the present embodiment, values within the window are subjected to simple binary coding by setting the following threshold th:

$$th = (MAX + MIN)/2 \qquad (1).$$

An LUT (look-up table) 105 receives quantized information within the window and outputs values stored in the table. Relative distribution ratios when synthesizing the MAX and MIN values for respective quantization patterns provided by the quantization unit 104 are stored in the table. A linear transformation unit 106 performs linear transformation by synthesizing the MAX and MIN values based on the distribution ratios. A pixel subjected to linear transformation is represented by F(p,q). The target pixel after linear transformation is subjected to linear interpolation calculation (the coprimary interpolation method shown in FIG. 11) by an interpolation unit 107 based on information relating to the surrounding pixels subjected to linear transformation in the same manner. Each pixel developed into (N×M) pixels by interpolation processing is represented by P(i,j). A high-resolution-information forming unit 108 determines from the value P(i,j) a pixel value H(i,j) to be output in the following manner:

$$H(i,j) = MAX, \text{ when } th \geq P(i,j)$$

$$H(i,j) = MIN, \text{ when } th < P(i,j) \qquad (2).$$

The method for forming high-resolution information is, of course, not limited to the method of expression (2). For example, input information may be divided into a character portion, a natural-image portion and the like, which may be processed according to different methods. Alternatively, pixel values may be calculated without using a threshold. High-resolution information may also be formed according to methods disclosed in Laid-Open Japanese Patent Applications (Kokai) Nos. 7-93531 (1995), 7-107268 (1995) and 7-105359 (1995).

The formed high-resolution information comprising N×M pixels for each target pixel is output from an output terminal 109.

FIG. 2 is a diagram illustrating the detailed configuration of the linear transformation unit 106. A block surrounded by broken lines indicates the linear transformation unit 106. A case in which an input signal has n-bit depth information is described below. Information input to the linear transformation unit 106 comprises three kinds of values, i.e., the MAX value, the MIN value, and an output value from the LUT 105. The value comprises m bits. A multiplier 201 calculates the product of the value by the MAX value, and a multiplier 202 calculates the product of a value (2 m − ) by the MIN value (2m indicates $2^m$). An adder 203 adds the results of the respective calculation operations, and the result of the addition is subjected to bit shift processing by a bit shift unit 204. The bit shift processing is performed for returning the bit length comprising (n×m) bits obtained as the result of the multiplication to an n-bit signal, and shifts the input signal by m bits. It is preferable to experimentally set a value suitable for the system configuration as the value m.

If the bit length of the value comprises m bits, values allowed for are between 0 and (2m−1). Hence, in the configuration shown in FIG. 2, the multiplication coefficients for the MAX value are 0~(2m−1), and the multiplication coefficients for the MIN value are 1~2m. In order to allocate 0~2m for the multiplication coefficients for both of the MAX and MIN values, the bit length of the value may be increased by one bit. Alternatively, allocation for the coefficients may be slightly changed so that usable 2m cases are selected from among (2m+1) cases from 0 to 2m. Thus, the bit length of the value is adjusted to be equal to n bits, i.e., the bit length of the input MAX and MIN values.

That is, if the value is normalized to have a coefficient value between 0 and 1, the liner transformation unit 106 performs a calculation so that a converted value F(p,q) is expressed by:

$$F(p,q) = MAX + (1-)MIN \qquad (3).$$

Next, a description is provided of actual processing illustrating a case of transforming image information into information having the number of pixels multiplied by 4 times in both the vertical and horizontal directions.

Figure 4:
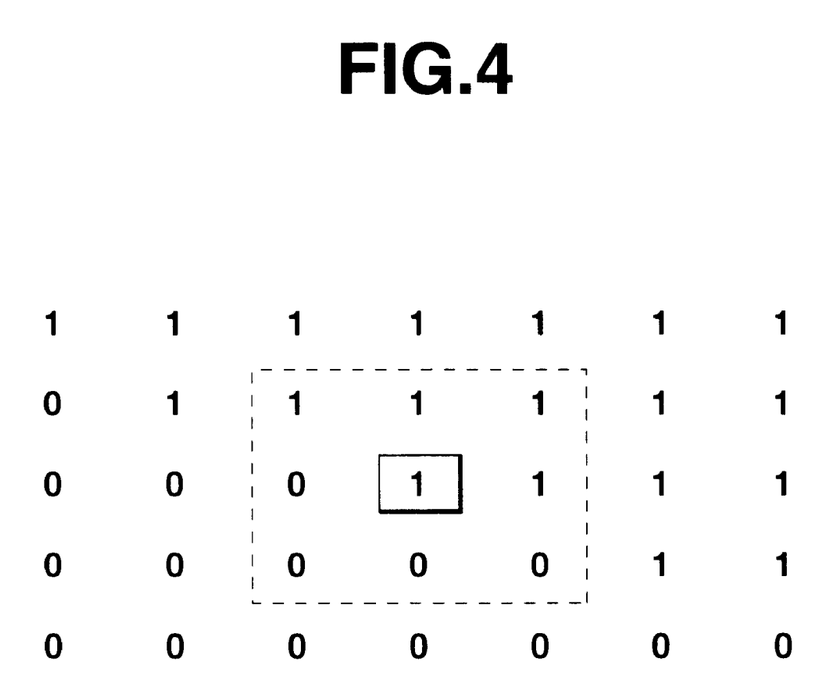
FIG. 4 is a diagram illustrating an example of quantization processing of the information shown in FIG. 3.

FIG. 3 illustrates input low-resolution information. A portion surrounded by broken lines is a window comprising 3 ×3 pixels for referring to surrounding pixels, and a pixel at the center surrounded by solid lines is a target pixel. MAX and MIN values are detected from respective pixels within the window, and the values of the respective pixels are subjected to simple binary coding using the value th derived from expression (1). FIG. 4 illustrates the result of binary coding of pixels around the window. Since the size of the window is 3×3 pixels, the target pixel can be transformed if there is a buffer memory for 5×5 pixels.

Figure 5:
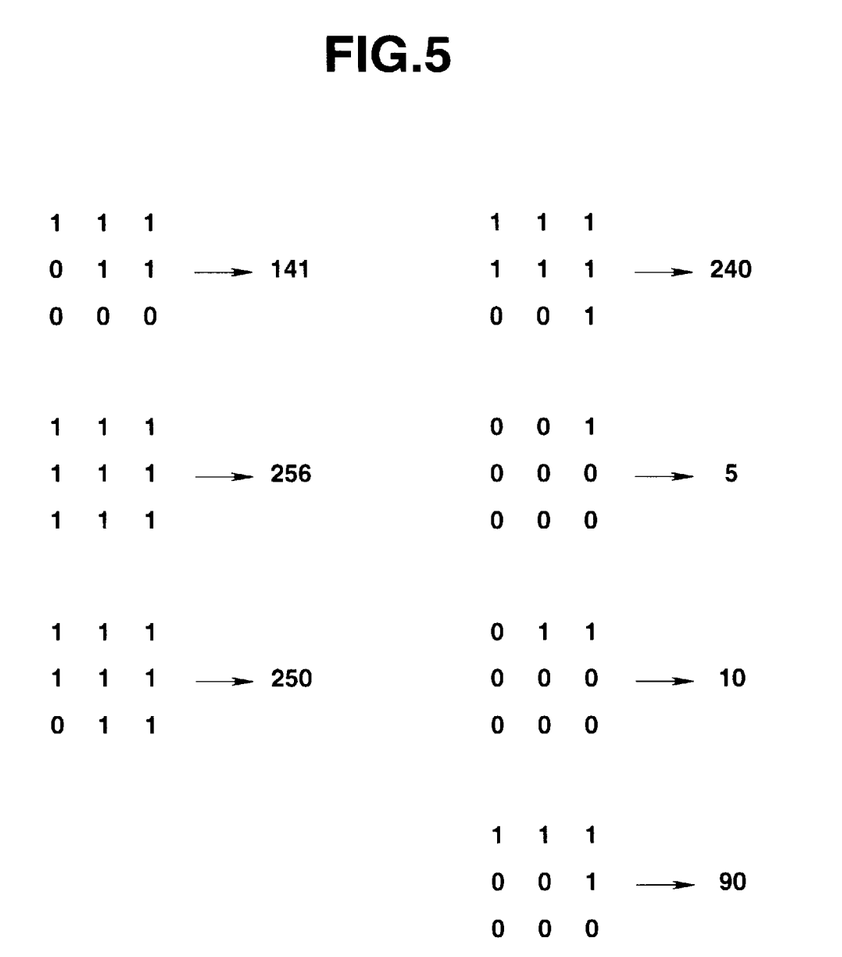
FIG. 5 is a diagram illustrating an example of multiplication coefficients for respective quantization patterns.
Figure 6:
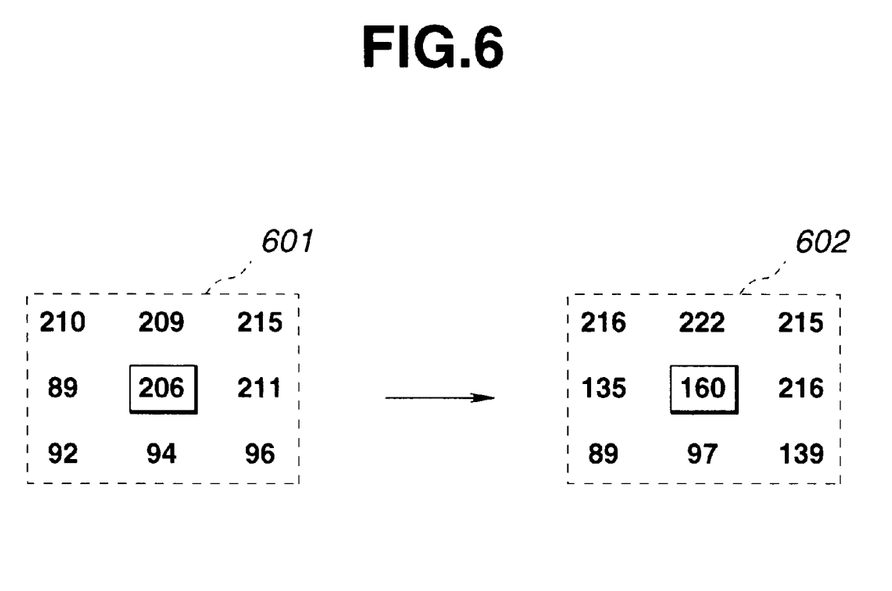
FIG. 6 is a diagram illustrating an example of transformation of pixel values within a window.

FIG. 5 illustrates an example of coefficients ( is 8-bit information) stored in the LUT 105. As described above, is a multiplication coefficient for the MAX value of the target pixel for a binary pattern comprising 9 pixels within the window. According to the configuration shown in FIG. 2, multiplication/summation calculation of linear transformation of the MAX and MIN values is executed using the multiplication coefficients . FIG. 6 illustrates the result of the multiplication/summation calculation. That is, the respective pixels within the window surrounded by the broken lines are transformed from 601 into 602 indicated in FIG. 6. Then, the target pixel is subjected to interpolation calculation into 16 pixels based on the transformed information within the window.

Figure 8:
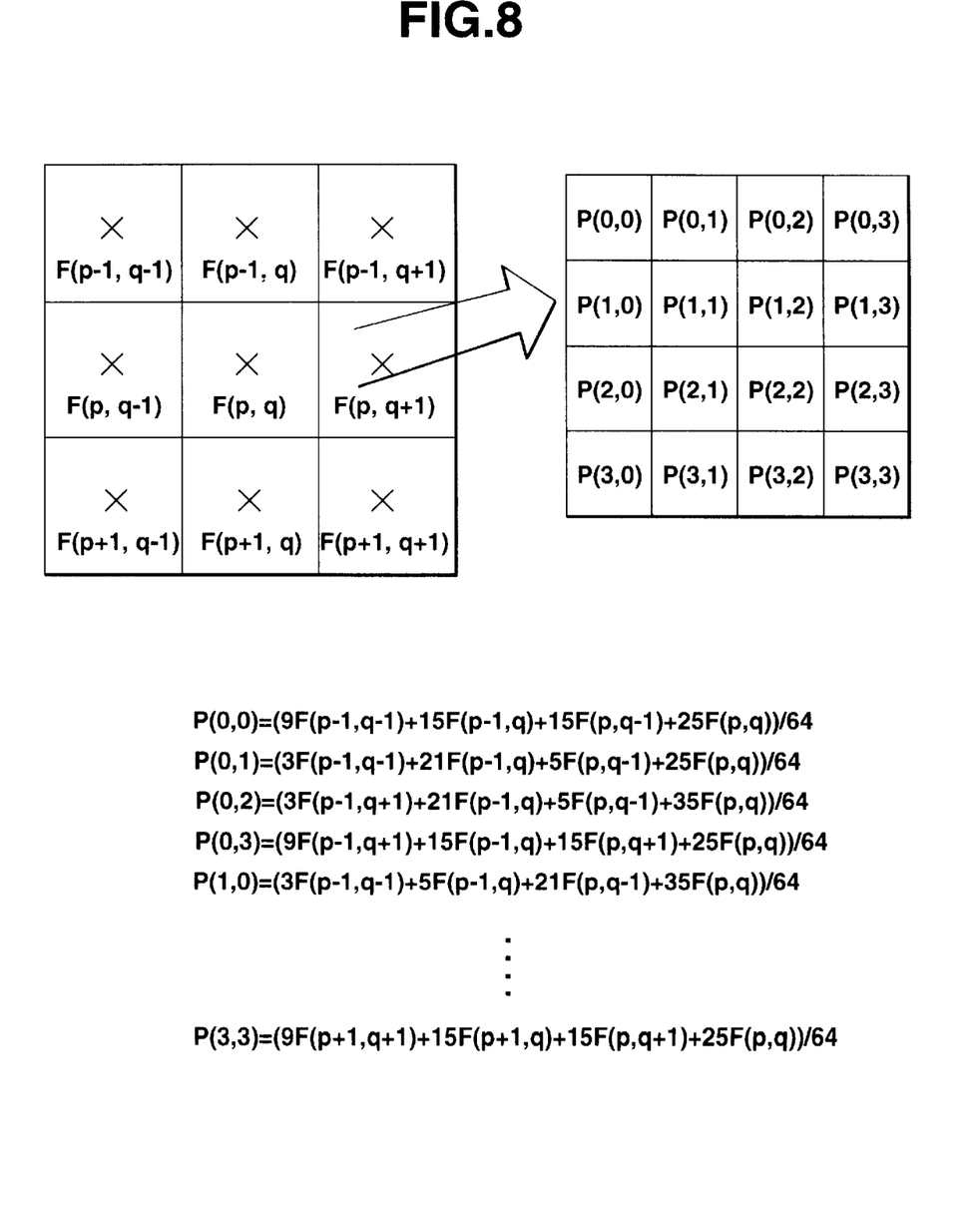
FIG. 8 is a diagram illustrating interpolation processing by an interpolation unit shown in FIG. 1.

The interpolation calculation will now be described with reference to FIG. 8.

Respective pixels within the window after the transformation by the linear transformation unit 106 are represented by F(p−1,q−1)−F(p+1,q+1). The target pixel is represented by F(p,q).

The pixel F(p,q) is now expanded to 16 pixels. If the 16 expanded pixels are represented by P(0,0)−P(3,3), the interpolation value for each pixel is calculated using a weighting coefficient determined by a linear area ratio and by multiplication/summation calculation for 4 pixels selected from 7 pixels, as in the coprimary interpolation method shown in FIG. 11.

Figure 7:
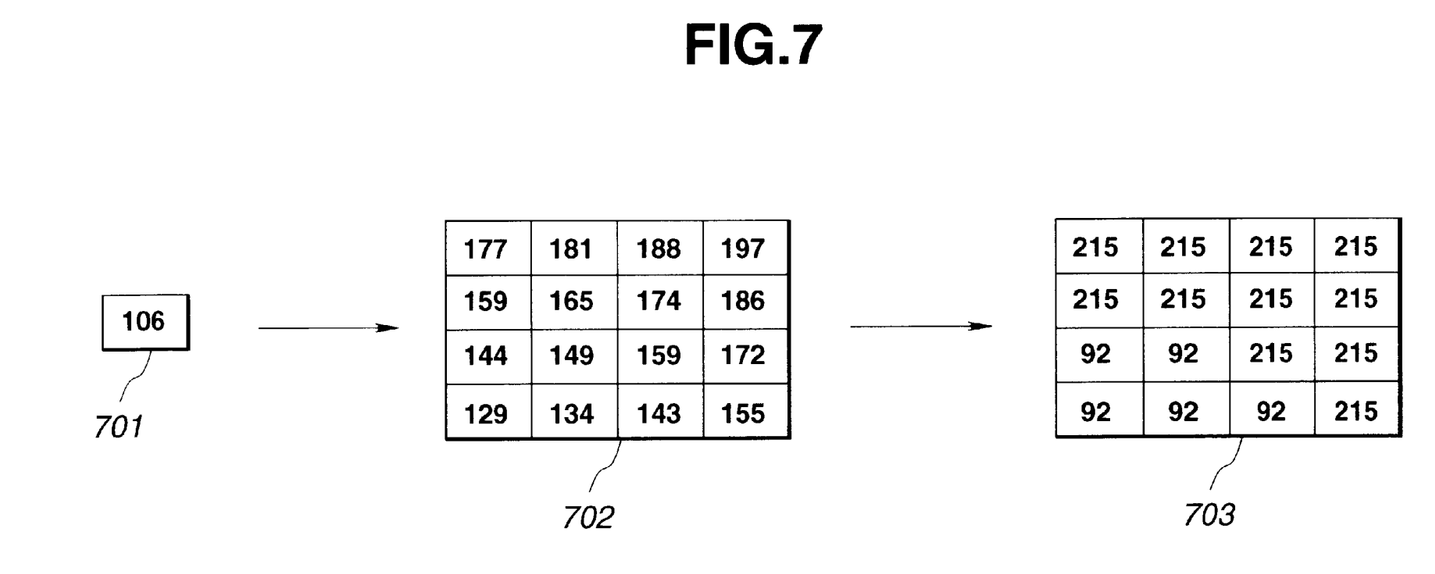
FIG. 7 is a diagram illustrating an example of interpolation of a target pixel and formation of high-resolution information.

FIG. 7 illustrates the result of linear interpolation calculation.

In FIG. 7, reference numeral 701 represents a target pixel subjected to linear transformation by the linear transformation unit 106, and has a pixel value "160". Reference numeral 702 represents the result of linear interpolation calculation in the case of 4 times×4 times, in which the target pixel having the value "160" is expanded by interpolation into 16 pixels. High-resolution information is formed from the 16 pixels after the linear interpolation calculation. If expression (2) is used as the simplest method for forming high-resolution information, respective pixels in 702 are quantized by using the mean value "153" of the MAX value ("215") and the MIN value ("92") as a threshold, and the MAX value is allocated to pixels greater than the threshold, and the MIN value is allocated to other pixels (703).

As is apparent from 703, a transformation corrsponding to high-resolution information can be realized.

As described above, the high-resolution information shown in FIG. 7 is formed not only using expression (2), but also by utilizing the methods diclosed in the above-mentioned Laid-Open Japanese Patent Applications (Kokai) Nos. 7-93531 (1995), 7-107268 (1995) and 7-105359 (1995).

For example, it is also possible to determine the pixel value H(i,j) of high-resolution information according to the following expression (4) or (5) using the above-described th and P(i,j):

$$H(i,j) = a \cdot MAX + (1-a) \cdot P(i,j), \text{ when } P(i,j) \geq th$$

$$H(i,j) = a \cdot MIN + (1-a) \cdot P(i,j), \text{ when } P(i,j) < th \qquad (4),$$

where "a" is a coefficient, or $$H(i,j) = a \cdot MAX + b \cdot MIN + c \cdot P(i,j) \qquad (5),$$

where a, b and c are coefficients.

By using expression (4) or (5), an edge of high-resolution information where pixel values within the edge change more smoothly is formed instead of a knife edge as defined by expression (2).

In the present embodiment, since a LUT is used, transformation into pixel values with a high degree of freedom are performed. That is, in the method of transforming the value of a target pixel using smoothing filters, it is not easy to form desired transformed values because only a limited number of filters can be used. However, by adopting a configuration in which a multiplication coefficient is determined based on a quantization pattern as in the present embodiment, it is possible to experimetally store various coefficient values. As a result, it becomes easy to obtain a desired transformed value.

Although in the present embodiment, a description has been provided illustrating a window size comprising 3×3 pixels, the number of pixels may, of course, be greater or smaller than the illustrated value. Furthermore, although the same window is used as the window for detecting the MAX and MIN values and as the window for inputting values to the LUT, different windows may, of course, be used.

Figure 9:
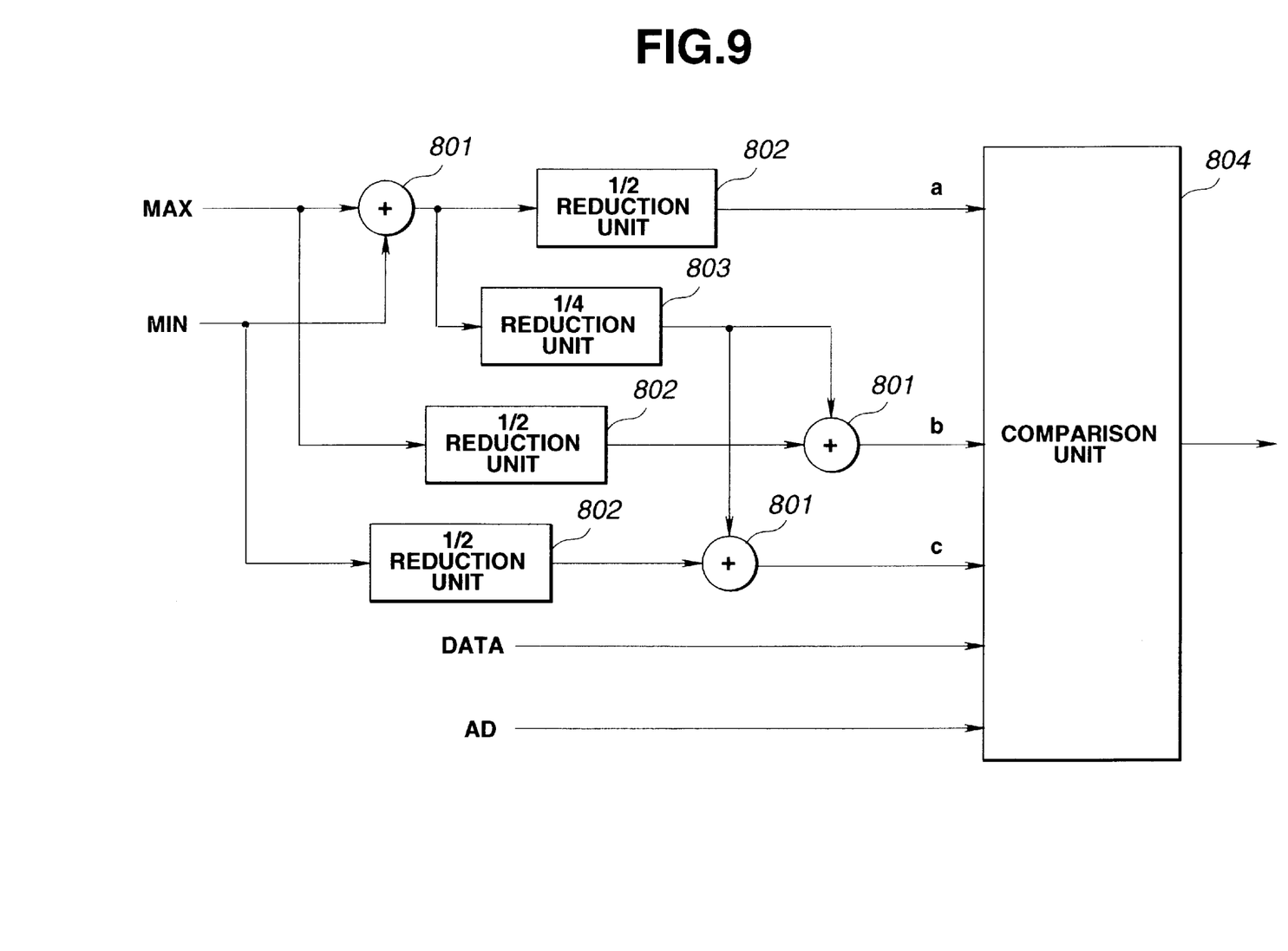
FIG. 9 is a block diagram illustrating another example of a quantization unit shown in FIG. 1.

FIG. 9 is a block diagram illustrating another example of the quantization unit 104 in the present embodiment. In the above-described case, respective pixels within the window are subjected to simple binary coding according to expression (1) to form a pattern, and the pattern information is input to the LUT. In the case shown in FIG. 9, however, instead of performing uniform quantization for pixels within the window, the quantiation bit length is changed for the target pixel and surrounding pixels.

In FIG. 9, there are shown an adder 801, a ½ reduction unit 802 and a ¼ reduction unit 803. The units 802 and 803 are configured so as to perform a bit shift. In the configuration of the adder and bit shift shown in FIG. 9, the following calculation is performed using input MAX and MIN values to form three kinds of signals a, b and c:

a=(MAX+MIN)/2 b=(3MAX+MIN)/4 c=(MAX+3MIN)/4                                              (6).

A comparison unit 804 compares input n-bit information within the window (DATA shown in FIG. 9) with the three calculated values a, b and c which serve as thresholds. Calculation according to expression (6) may, of course, be performed by multiplication/summation calculation without using the configuration of FIG. 9. In the case of FIG. 9, the target pixel is quantized into four values, and other pixels than the target pixel within the window are quantized into two values. That is, in the case of a window comprising (3×3) pixels, information comprising 10 bits in total is obtained. Naturally, in the case of FIG. 9, a capacity for an address space of 10 bits is required for the LUT, and multiplication coefficients for the MAX value adapted to a 10-bit input are generated.

In the foregoing case, the transformed value for the target pixel is set irrespective of the value of the target pixel. That is, it is impossible to determine a relative value for the target pixel within a range comprising (MAX −MIN). On the other hand, in the case of FIG. 9, it is possible to determine whether the target pixel has a value close to the MAX value within the range, or a value close to an intermediate value, or a value close to the MIN value. It is, of course, preferable to experimentally derive the value of the target pixel, and multiplication coefficients to be given to patterns within the window.

In the present embodiment, it is, of course, preferable that all pixels within the window are input to the LUT in the form of input n-bit information. However, this is not a realistic approach because the capacity of the LUT must have an address space for (n bits×the number of pixels within the window). Accordingly, each pixel is quantized to a value less than n bits and the obtained value is input to the LUT. For example, if an input signal comprises 8 bits, the target pixel may be quantized into 2 bits and surrounding pixels may be quantized into 1 bit as in the present embodiment. If the capacity of the LUT is sufficient, the target pixel may be quantized into 4 bits, and surrounding pixels may be quantized into 1 bit or 2 bits. The number of quantization bits may be increased for pixels spatially closer to the target pixel from among surrounding pixels. Since the LUT is expected to have the function of a LPF (low-pass filter) for removing frequency components depending on input low-resolution information, it is preferable to experimentally set the capacity of the LUT, and the number of bits and the value of multiplication coefficients in consideration of the system configuration.

Although a description has been provided of the generation of multiplication coefficients which are the relative ratios of MAX and MIN values, it is also possible, for example, to set a part of output from the LUT to other items than the multiplication coefficients. For example, a flag may be set such that, when the output value from the LUT is "0", the value does not indicate a multiplication coefficient, and the input value of the target pixel is made a transformed value without being modified.

Although in the foregoing description, MAX and MIN values necessary for quantization calculation are the same as MAX and MIN values necessary for multiplication for calculating transformed values, the two kinds of MAX and MIN values may have different values detected from different windows. Furthermore, the window size may be adaptively changed. In addition, the above-described processing may be performed only for edge portions, and linear interpolation using nontransformed pixel values within the window may be performed for flat portions.

It is also possible to use the above-described configuration together with a conventional configuration using digital filters. That is, the configuration of the invention has the features of a high processing speed and a high degree of freedom for transformed values. On the other hand, while the conventional configuration using digital filters requires a considerable amount of time for processing, the configuration according to the invention performs smoothing faithful to input data. Accordingly, a system configuration, in which a method for calculating transformed values using digital filters by determining the states of pixel values within a window and a method for calculating transformed values by performing linear transformation calculation using adaptive distribution ratios of MAX and MIN values by quantizing the states of pixel values within a window and substituting the obtained values in an LUT are mixed, is also effective.

As described above, according to the present invention, when transforming input low-resolution information into high-resolution information, an interpolation technique capable of obtaining excellent picture quality having a high degree of freedom in the design of an image at a speed higher than presently known is realized. According to this technique, a high-resolution image of high quality is obtained even from an image having a small amount of information.

The individual components designated by blocks in the drawings are all well-known in the image processing apparatus and method arts and their specific construction and operation are not critical to the operation or the best mode for carrying out the invention.

While the present invention has been described with respect to what are presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image processing apparatus for transforming input low-resolution information into high-resolution information by increasing a number of pixels, said apparatus comprising:

window setting means for setting a window including information relating to a low-resolution target pixel and pixels surrounding the target pixel;

detection means for detecting a maximum value A and a minimum value B from among a plurality of pixels within the window;

quantization means for quantizing information relating to each pixel having n values within the window into a value smaller than n;

determination means for determining a distribution ratio a of the values A and B based on quantized values provided by said quantization means within the window;

transformation means for calculating a transformation value F of the target pixel according to a formula, F= A+(1- ) B;

interpolation means for calculating an interpolation value based on the transformation value F by said transformation means; and formation means for forming high-resolution information based on the interpolation value and values A and B, wherein said determination means includes a memory for outputting the distribution ratio in accordance with patterns of the quantized values within the window.

2. An image processing method of transforming input low-resolution information into high-resolution information by increasing a number of pixels, said apparatus comprising:

a window setting step of setting a window including information relating to a low-resolution target pixel and pixels surrounding the target pixel;

a detection step of detecting a maximum value A and a minimum value B from among a plurality of pixels within the window;

a quantization step of quantizing information relating to each pixel having n values within the window into a value smaller than n;

a determination step of determining a distribution ratio of the values A and B based on quantized values provided by said quantization step within the window;

a transformation step of calculating a transformation value F of the target pixel according to a formula, F= A+(1- ) B;

an interpolation step of calculating an interpolation value based on the transformation value F by said transformation step; and a formation step of forming high-resolution information based on the interpolation value and values A and B, wherein said determination step outputs the distribution ratio from a memory in accordance with patterns of the quantized values within the window.

3. An apparatus according to claim 1, wherein said quantization means linearly quantizes values between the values A and B.

4. An apparatus according to claim 1, wherein said quantization means makes a number of quantization levels for the target pixel greater than a number of quantization levels for pixels surrounding the target pixel within the window.

5. A method according to claim 2, wherein said quantization step linearly quantizes values between the values A and B.

6. A method according to claim 2, wherein said quantization step makes a number of quantization levels for the target pixel greater than a number of quantization levels for pixels surrounding the target pixel within the window.

* * * * *

UNITED STATES PATENT AND TRADEMARK OFFICE
CERTIFICATE OF CORRECTION

PATENT NO.    : 6,009,213
DATED         : December 28, 1999
INVENTOR(S)   : Nobutaka Miyake It is certified that error appears in the above-identified patent and that said Letters Patent is hereby corrected as shown below:

<u>Title page,</u>
Item [56], References Cited, FOREIGN PATENT DOCUMENTS,
  "7093531" should read -- 7-93531 --,
  "7105359" should read -- 7-105359 --.
  "7107268" should read -- 7-107268 --.

<u>Column 1,</u>
Line 51, "jaggy" should read -- a jaggy --;
Line 65, "an" should read -- for an --; and
Line 66, "the" should be deleted.

<u>Column 2,</u>
Line 50, "pixture" should read -- picture --.

<u>Column 5,</u>
Line 6, "value" should read -- value $\alpha$ --;
Line 7, "value" should read -- value $\alpha$ --;
Line 8, "value" should read -- value $\alpha$ --;
Line 9, "(2m-)" should read -- (2^m-$\alpha$) --;
Line 10, "(2m" should read -- (2^m --;
Line 19, "value" should read -- value $\alpha$ --;
Line 20 "for" should read -- for $\alpha$ -- and "(2m-)." should read -- (2^m-1). --;
Line 22, "0~(zm-1)," should read -- 0~(2^m-1), --;
Line 23, "1~2m." should read -- l~2^m. --;
Line 24, "0~2m" should read -- 0~2^m --;
Line 25, "value" should read -- value $\alpha$ --;
Line 27, "2m" should read -- 2^m --;
Line 28, "(2m+1)" should read -- (2^m+1) and "2m" should read -- 2^m --;
Line 31, "value" should read -- value $\alpha$ --;
Line 32, "liner" should read -- linear --;

UNITED STATES PATENT AND TRADEMARK OFFICE
CERTIFICATE OF CORRECTION

PATENT NO.     : 6,009,213
DATED          : December 28, 1999
INVENTOR(S)    : Nobutaka Miyake It is certified that error appears in the above-identified patent and that said Letters Patent is hereby corrected as shown below:

Column 5, con't.
Line 35, "MAX +(1-) MIN" should read -- $\alpha$ MAX +(1- $\alpha$ MIN --;
Line 52, "coefficients (is 8-bit" should read -- coefficients $\alpha$ ($\alpha$ is 8-bit --.
Line 53, "above," should read -- above, $\alpha$ --; and
Line 59, "coefficients." should read -- coefficients $\alpha$. --.

Column 6,
Line 55, "are" should read -- is --.

Column 7,
Line 11, "quantiation" should read -- quantization --.

Column 9,
Line 13, "F=A+(1-)B;" should read -- F=$\alpha$A+(1-$\alpha$)B --; and
Line 21, "ratio" should read -- ratio $\alpha$ --.

Column 10,
Line 1, "ratio" should read -- ratio $\alpha$ --;
Line 6, "F=A+(1-) B;" should read -- F=$\alpha$A+(1-$\alpha$)B --;
Line 15, "ratio" should read -- ratio $\alpha$ --.

Signed and Sealed this

Twenty-first Day of January, 2003

JAMES E. ROGAN
*Director of the United States Patent and Trademark Office*